(12) United States Patent (10) Patent No.: US 11,619,541 B2
Ozharar et al. (45) Date of Patent: Apr. 4, 2023

(54) VEHICLE SPEED, DIRECTION, AND SIZE MEASUREMENT USING TEMPORAL DISTRIBUTED FIBER OPTIC SENSING

(71) Applicant: NEC Laboratories America, Inc., Princeton, NJ (US)

(72) Inventors: Sarper Ozharar, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/227,325

(22) Filed: Apr. 11, 2021

(65) Prior Publication Data
US 2021/0318164 A1 Oct. 14, 2021

Related U.S. Application Data

(60) Provisional application No. 63/009,679, filed on Apr. 14, 2020.

(51) Int. Cl.
*G01H 9/00* (2006.01)
*G08G 1/01* (2006.01)
*G08G 1/017* (2006.01)

(52) U.S. Cl.
CPC .............. *G01H 9/004* (2013.01); *G08G 1/017* (2013.01); *G08G 1/0116* (2013.01)

(58) Field of Classification Search
CPC ...... G01H 9/004; G01H 9/006; G08G 1/0116; G08G 1/017; G08G 1/01; G08G 1/02; G08G 1/04; G08G 1/0125; G08G 1/0145; E01F 11/00; G01R 15/24; G06N 20/00
See application file for complete search history.

(56) References Cited

U.S. PATENT DOCUMENTS

| | | | |
|---|---|---|---|
| 2004/0080432 A1* | 4/2004 | Hill .................... | E01F 11/00 340/942 |
| 2006/0257066 A1* | 11/2006 | Hill .................... | G01D 5/35303 385/12 |
| 2014/0249711 A1* | 9/2014 | Hanson .............. | G07C 5/08 701/29.1 |
| 2017/0358205 A1* | 12/2017 | Ippolito ............. | G08G 1/02 |
| 2019/0206240 A1* | 7/2019 | Gonçalves ......... | G01G 3/125 |

FOREIGN PATENT DOCUMENTS

| | | | | | |
|---|---|---|---|---|---|
| KR | 20000023722 A | * | 4/2000 | .......... | G01R 15/246 |
| KR | 20190054788 A | * | 5/2019 | ............. | G01B 11/02 |

OTHER PUBLICATIONS

Machine Translation of KR-20190054788-A , Jul. 2022.*
MachineTranslation of KR-20000023722-A , Jul. 2022.*

* cited by examiner

*Primary Examiner* — Sisay Yacob
(74) *Attorney, Agent, or Firm* — Joseph Kolodka

(57) ABSTRACT

Aspects of the present disclosure describe distributed fiber optic sensing (DFOS) systems, methods, and structures that advantageously enable and/or facilitate the continuous, real-time monitoring and identification vehicle speed, vehicle direction, vehicle axle width, vehicle type, total number of vehicle axles, and vehicle count. The DFOS sensing fiber is advantageously positioned underneath a roadway/highway in a novel arrangement/layout and temporal measurements are made to provide vehicle identification.

10 Claims, 8 Drawing Sheets

VEHICLE SPEED, DIRECTION, AND SIZE MEASUREMENT USING TEMPORAL DISTRIBUTED FIBER OPTIC SENSING

CROSS REFERENCE

This disclosure claims the benefit of U.S. Provisional Patent Application Ser. No. 63/009,679 filed 14 Apr. 2020 the entire contents of which is incorporated by reference as if set forth at length herein.

TECHNICAL FIELD

This disclosure relates generally to distributed fiber optic sensing (DFOS) systems, methods, and structures that provide real-time vehicle speed, direction, and size measurement.

BACKGROUND

As is known, the ability to monitor—in real-time—current traffic conditions is both important and challenging as it provides for highway management, traffic management, highway safety, highway accident detection as well as providing subsequent smart city operation. Given its importance in contemporary society, systems, methods, and structures which facilitate real-time traffic monitoring would represent a significant advance in the art.

SUMMARY

An advance in the art is made according to aspects of the present disclosure directed to distributed fiber optic sensing systems (DFOS), methods, and structures that advantageously enable and/or facilitate continuous, real-time monitoring and identification of vehicles traversing a highway/roadway under which the DFOS sensing fiber is positioned.

In sharp contrast to the prior art, systems, methods, and structures according to aspects of the present disclosure employ a novel and nonobvious layout of the sensing fiber that permits the association of a vehicle's geometric properties to its temporal behavior.

BRIEF DESCRIPTION OF THE DRAWING

A more complete understanding of the present disclosure may be realized by reference to the accompanying drawing in which.

DESCRIPTION

Figure 1:
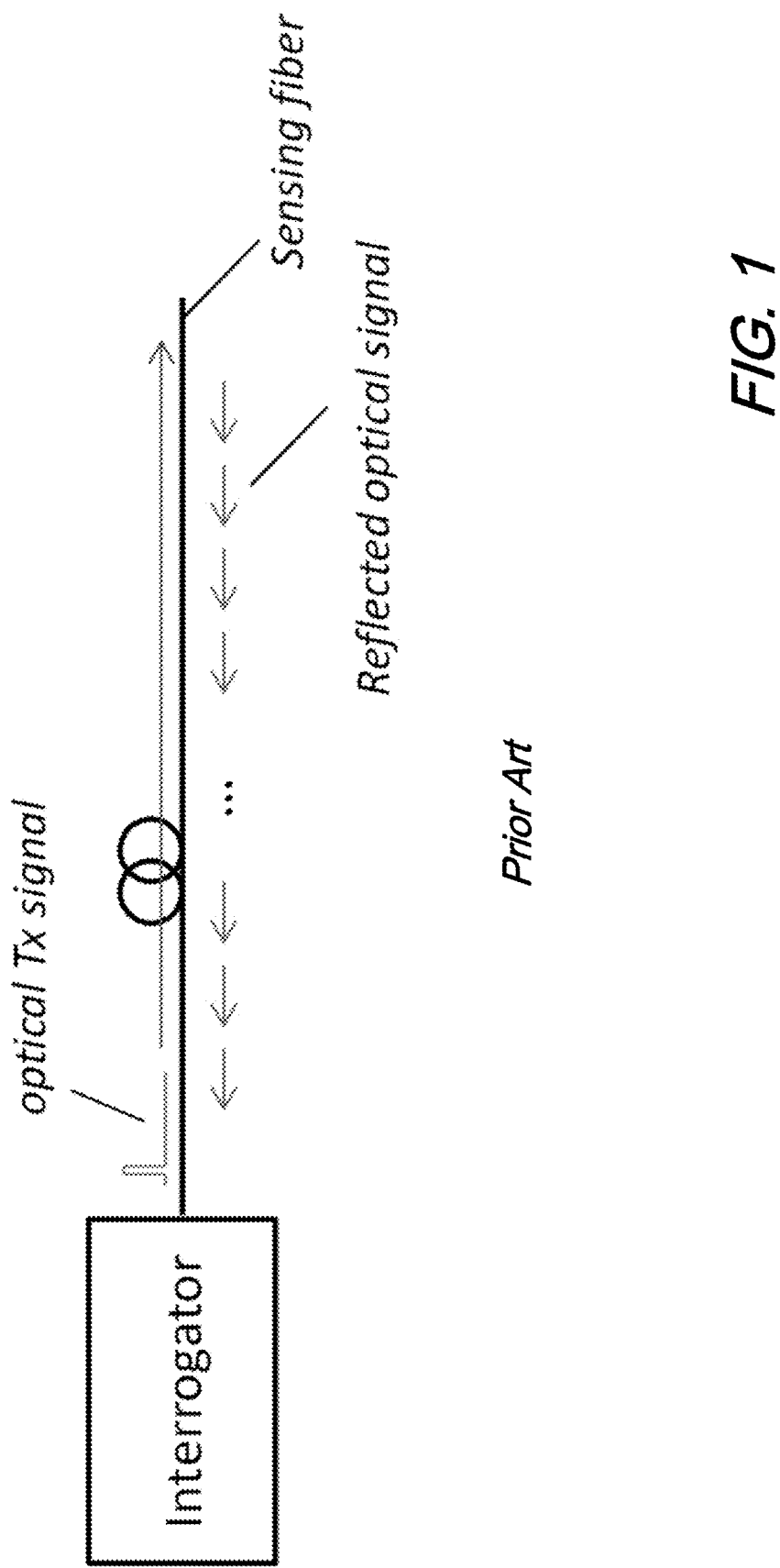
FIG. 1 is a schematic diagram of an illustrative distributed fiber optic sensing system and operation generally known in the art.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background—and with reference to FIG. 1 which is a schematic diagram of an illustrative distributed fiber optic sensing system generally known in the art—we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DAS (Distributed Acoustic Sensor) interrogator to recover a vibration occurring anywhere along a sensing fiber in equivalent sampling frequency of the pulse repetition rate. For example, for a DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule.

As those skilled in the art will further appreciate, the temporal width of the optical pulse used in a DAS/DVS system is usually one of the critical parameters to determine the spatial resolution of the DAS/DVS system. In order to achieve high spatial resolution, one employs a shorter optical pulse.

On the other hand, nonlinearities in the fiber put an upper limit on the pulse peak power. This results in the characteristic that as one uses a shorter pulse, the maximum allowable pulse energy goes down as well—which unfortunately limits the reach of the system.

As a result, there exists a trade-off between a higher resolution and longer reach when configuring DFOS systems.

As we shall show and describe however, systems, methods, and structures according to aspects of the present disclosure overcome this and other deficiencies in the art by achieving a high spatial resolution measurement without requiring a short pulse and instead by using a temporal measurement. In other words, systems, methods, and structures according to aspects of the present disclosure achieve extreme high accuracy spatial measurement via a temporal measurement—which advantageously and surprisingly relieves any burden on the constraints of the DAS or the DVS system.

As we shall show further, other advantageous features provided by systems, methods, and structures according to aspects of the present disclosure include—but are not limited to: the invention are as follows: detection of vehicle speed, detection of vehicle direction, detection of axle width, motorcycle detection, detection of axle number, an ability to be connected in series for multi-lane detection, and an ability to be modified for even longer pulse widths.

Figure 2:
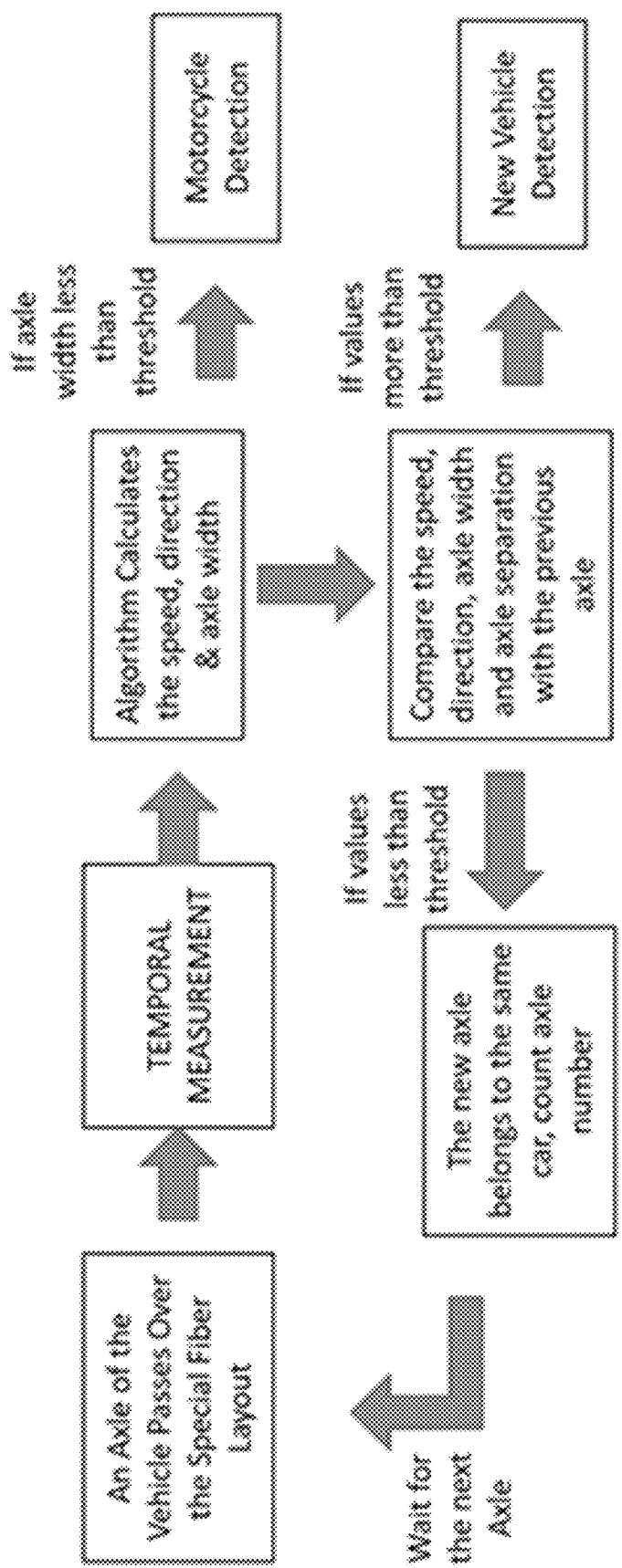
FIG. 2 is a schematic flow diagram illustrating an operational execution of a method according to aspects of the present disclosure.

FIG. 2 is a schematic flow diagram illustrating an operational execution of a method according to aspects of the present disclosure. With reference to that figure, it may be observed that a method according to aspects of the present disclosure is initiated when a vehicle axle passes over an inventive layout of an DFOS optical fiber—located under a roadway. Our method determines the properties of the axle namely, its speed, its direction, and its width. If the width is less than a predetermined threshold value, then the vehicle of which the axel is a component is determined by the system to be a motorcycle. The system then waits for the next vehicle axle to pass over the DFOS optical fiber. The same parameters are determined for this next axle along with a distance between this next (second) axle and the previous (first) axle. If the second axle parameters (the speed, the direction, and the width) are sufficiently different than the first axle parameters and/or the distance between the two axles is sufficiently large—as determined by a predetermined value, then this second, next axle is determined to be a new (different) vehicle. If the two parameters of the two axles are not sufficiently large, they are determined to be part of a same vehicle and the axle number is counted. This procedure is shown schematically in the flow chart in the figure.

Figure 3:
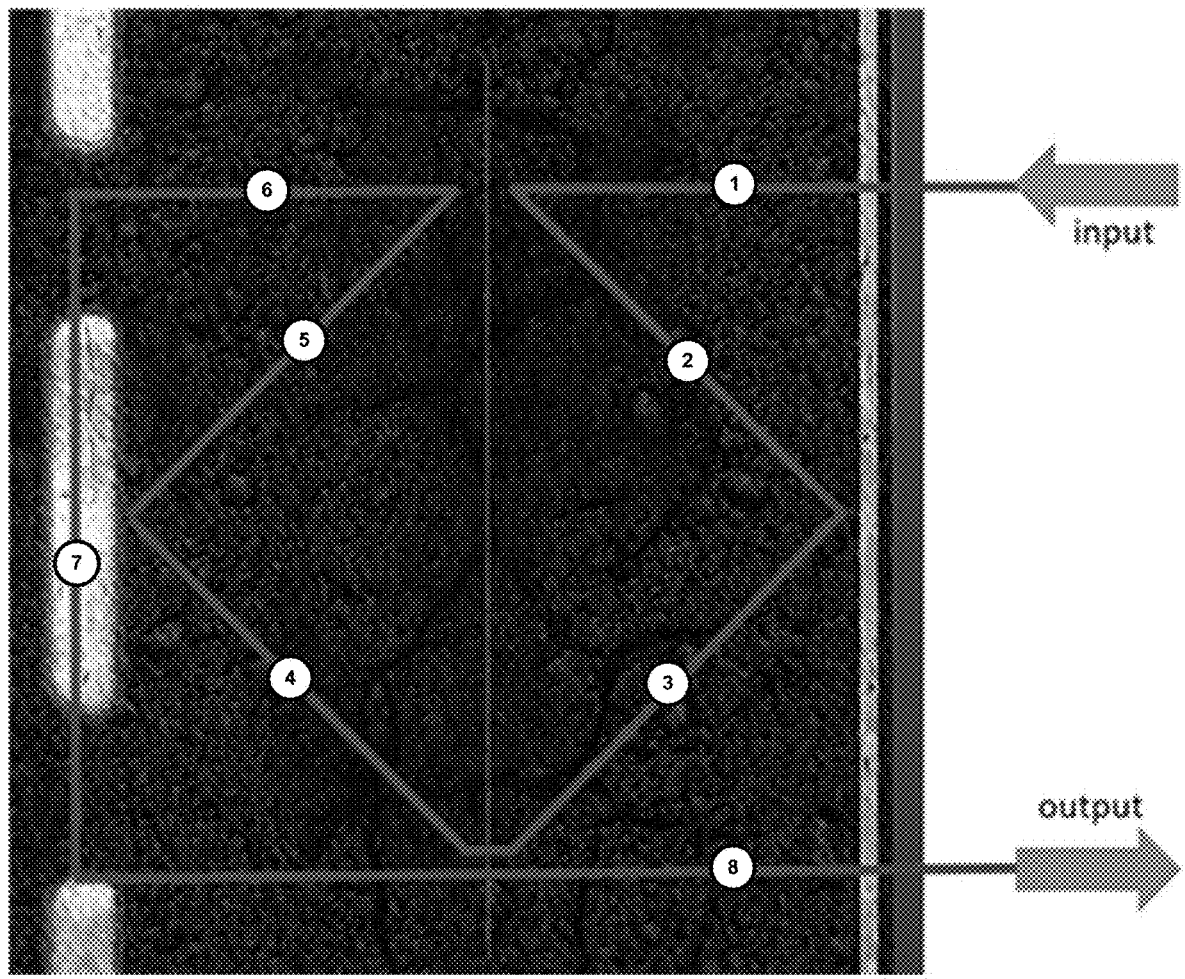
FIG. 3 is a schematic diagram of an illustrative layout of optical fiber beneath highway and/or roadway pavement according to aspects of the present disclosure.

FIG. 3 is a schematic diagram of an illustrative layout of optical fiber beneath highway and/or roadway pavement according to aspects of the present disclosure. As may be observed from that figure, the illustrative layout may be described generally as a "diamond in a box" layout formed by the optical fiber layout, wherein no part of the optical fiber layout overlies itself. Alternatively, and as shown, one illustrative layout may be thought of as two concentric squares—one inside another—each having an opening—the inner one (with shorter side lengths) rotated 45 degrees, all defining a continuous, non-overlapped, optical fiber path constructed from optical fiber cable positioned under a roadway/highway.

As illustratively shown in the figure, the illustrative layout may be considered as comprising eight sections. First, an input section that is substantially perpendicular to the highway/roadway length, extending from an edge of the roadway to a point near the center of the roadway; a second section, extending at an oblique angle from the first section, a third section, extending from the first section wherein at least a portion of which is substantially perpendicular to the first section, a fourth section, extending from the third section having a portion of which that is substantially perpendicular to the second section and parallel to the first section, a fifth section, extending from the fourth section having a portion that is substantially perpendicular to the fourth section and parallel to the third section, a sixth section, extending from the fifth section at an oblique angle from the fifth section and having a portion that is substantially parallel to the first section, a seventh section, having a portion that is substantially perpendicular to the sixth section and extending to an eighth section, the eighth section having a portion that is substantially perpendicular to the seventh section and parallel to the sixth and first sections, the eighth section being an output section.

Figure 4:
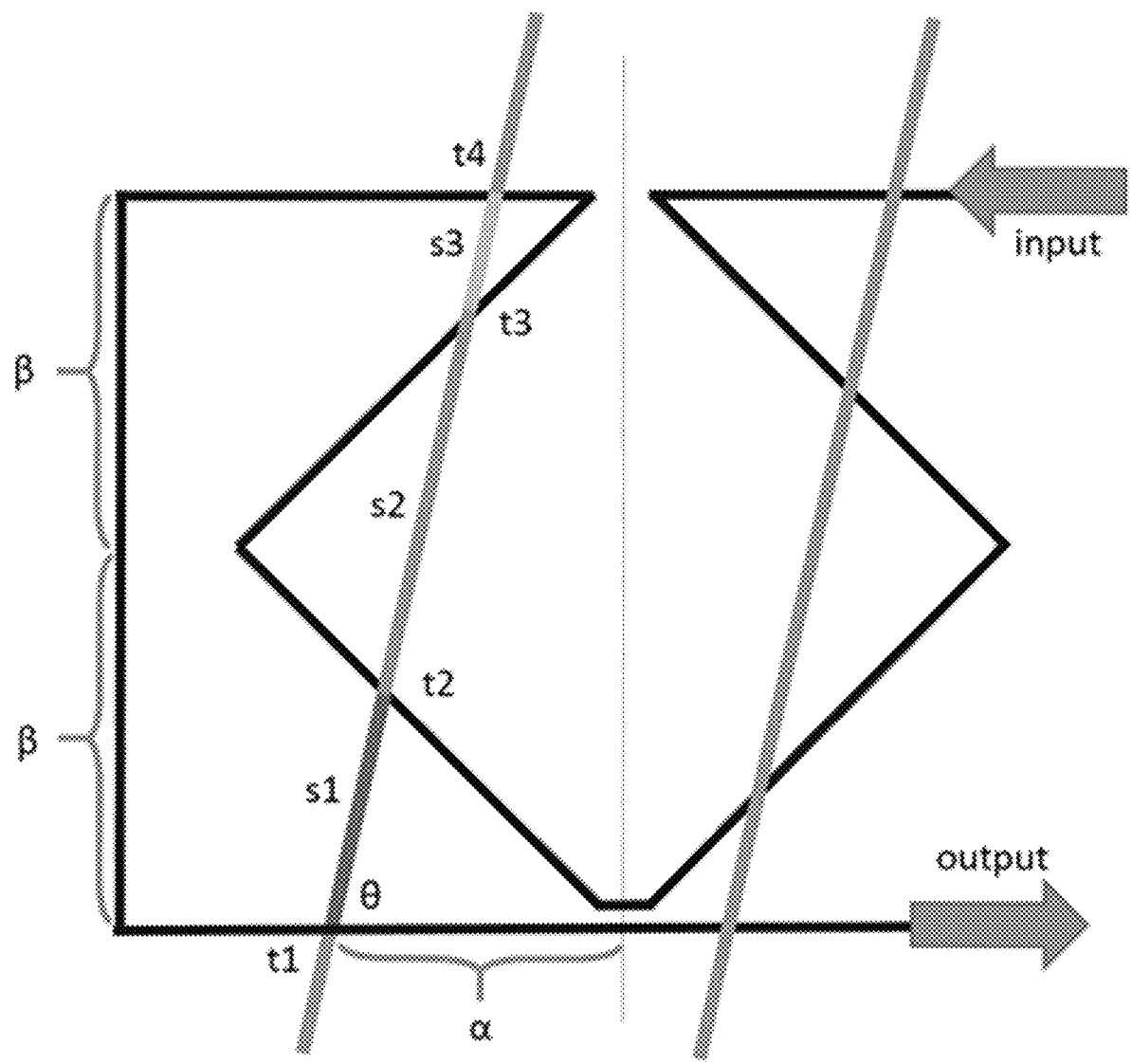
FIG. 4 is a schematic diagram of the illustrative layout of optical fiber beneath highway and/or roadway pavement of FIG. 3 and example vehicle tracks according to aspects of the present disclosure.

Advantageously, when a vehicle passes over our illustrative layout of DFOS sensor optical fiber as shown and described, an interaction may be detected as shown illustratively in FIG. 4, which is a schematic diagram of the illustrative layout of optical fiber beneath highway and/or roadway pavement of FIG. 3 and example vehicle tracks according to aspects of the present disclosure.

As may be observed in that figure, a two axle vehicle is traversing over an illustrative optical fiber layout that is a sensor fiber for a DFOS. The vehicle wheel track is illustrated by the two parallel lines.

Those skilled in the art will appreciate that there exist a number of unknowns which—according to aspects of the present disclosure—may now be advantageously determined. The unknowns include: the speed of the vehicle, the angle θ (vehicle direction), the distance of the vehicle wheel track to the center of lane (α) (to calculate the axle width), and the number of axles.

The known parameters include: the spacing β and all the angles in the fiber layout.

Assumptions include: the vehicle travels with constant velocity when passing over the fiber layout, the vehicle stays inside its lane, the angle θ (driving direction) is between 45-135 degrees, and the vehicle does not move forward and backward.

Once a vehicle passes over the fiber layout, each wheel (tire) overruns/passes over/through the fiber layout and creates a linear track in three sections (s1, s2, and s3) as shown in the figure.

Generally, the DFOS/Distributed Acoustic Sensing (DAS) system does NOT record or detect the point of contact of a tire on the fiber layout. Instead, the DAS system ONLY records the TIME of contact of the tire to different parts of the fiber layout. Those are shown in the figure as t1, t2, t3, and t4.

After normalizing time coordinates such that that t1=0 seconds, our method (developed algorithm/formula) determines any relation between these time coordinates and the physical and geometric properties of the vehicle.

The driving direction can be calculated according to the following:

$$\tan(\theta - 45) = \frac{t4 - 2t2}{2t3 - t4}$$

Then, the average speed of the vehicle is given as:

$$v = \frac{2\beta}{\sin(\theta)t4}$$

The distance of the tire track to the lane center is given by:

$$\alpha = t2 v \cos(\gamma)\sqrt{2},$$

where γ=θ−45.

By evaluating these characteristics for both left and right side of the tracks, systems, methods, and structures according to aspects of the present disclosure advantageously can provide the following advantages over the art namely, the following: A better accuracy in speed and the driving direction calculation; since both sides should give the same result, one can average left and right side results; and since we determine a summation of the α values from the left and right side of the vehicle, we advantageously obtain the axle width:

$$\text{axle}_{width} = \alpha_{right} + \alpha_{left}$$

As those skilled in the art will now understand, if there is only a one-sided track, or a calculated α value approaches zero, then a motorcycle is determined to be the source of the track.

At this point we may show for completeness the derivation of the above formulae. From geometry one can write the following equations:

$$s1 \cos(\gamma) + s1 \sin(\gamma) + s2 \sin(\gamma) = \beta\sqrt{2}$$

$$s2 \cos(\gamma) + s3 \sin(\gamma) + s3 \cos(\gamma) = \beta\sqrt{2}$$

In these above equations the values are defined as follows:

$$s1 = (t2-t1)v; \quad s2 = (t3-t2)v$$

$$s3 = (t4-t3)v; \quad t1 = 0; \quad \gamma = \theta - 45$$

It is not necessary, but for the sake of simplicity one can choose t1 as zero.

In the next step, one can show that the following equation should be satisfied:

$$(s2 + s1 - s3)\sin(\gamma) = (s2 + s3 - s1)\cos(\gamma)$$

From here it follows that:

$$\tan(\gamma) = \frac{s2 + s3 - s1}{s2 + s1 - s3}$$

which can be simplified to $$\tan(\gamma) = \frac{t4 - 2t2}{2t3 - t4}$$

which is the formula defining the driving direction.

After the determination of the angle, it is possible to determine the total length of the vehicle track as follows:

$$(s1 + s2 + s3) = \frac{2\beta}{\sin(\theta)}$$

which in turn allows the average speed of the vehicle to be determined by:

$$v = \frac{s1 + s2 + s3}{t4 - t1} = \frac{2\beta}{\sin(\theta)t4}$$

Finally, it is also possible to determine the distance of the tire track to the center of the lane according to the following:

$$\alpha = s1 \cos(\gamma)\sqrt{2}$$

which can be simplified as:

$$\alpha = t2 \, v \cos(\gamma)\sqrt{2}$$

Advantageously, this α parameter may be used to determine the axle width of the vehicle. Note that all of the above determinations/calculations will be done for both left and right sides of a track.

Figure 5:
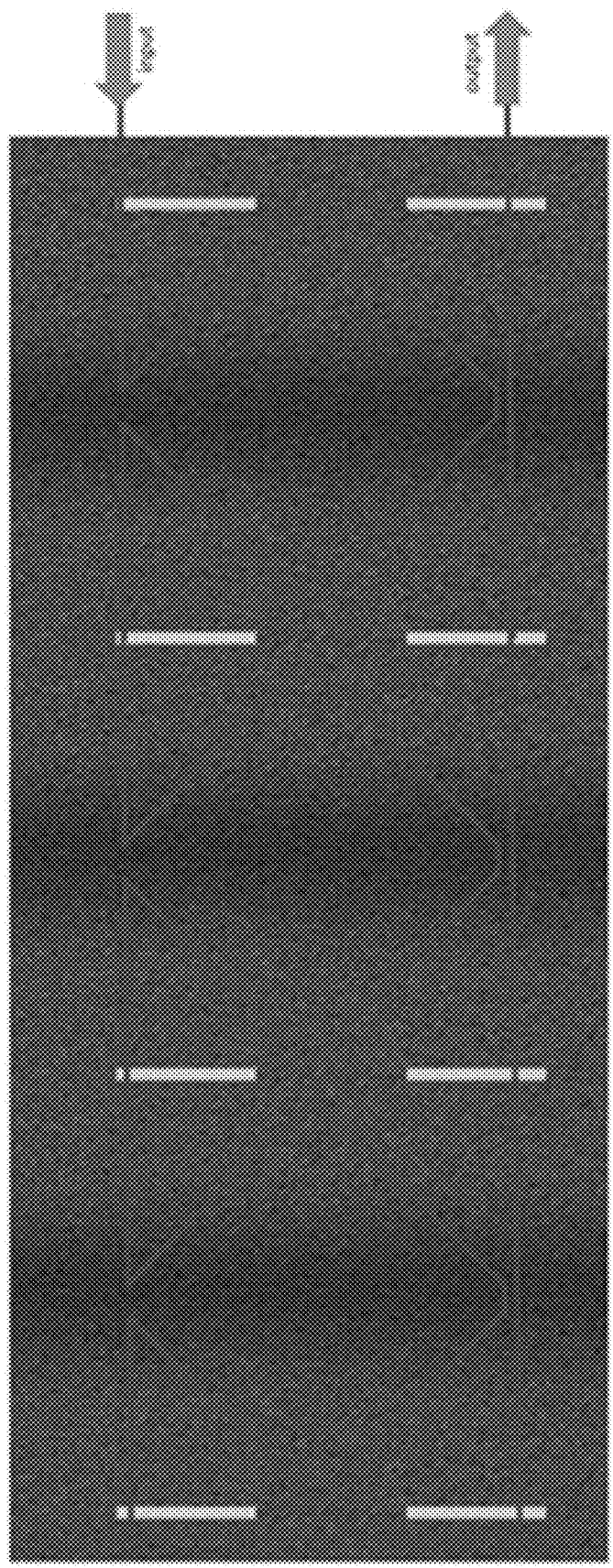
FIG. 5 is a schematic diagram of an illustrative layout of optical fiber beneath highway and/or roadway pavement in "series" for multi-lane highway/roadway application according to aspects of the present disclosure.

FIG. 5 is a schematic diagram of an illustrative layout of optical fiber beneath highway and/or roadway pavement in "series" for multi-lane highway/roadway application according to aspects of the present disclosure. As shown in that figure, the illustrative layout described previously is extended in substantially a "series" arrangement, such that "three diamond" layouts are made in a three lane highway, the layout having a single input and single output and—like before—none of the fiber overlies itself.

Figure 6:
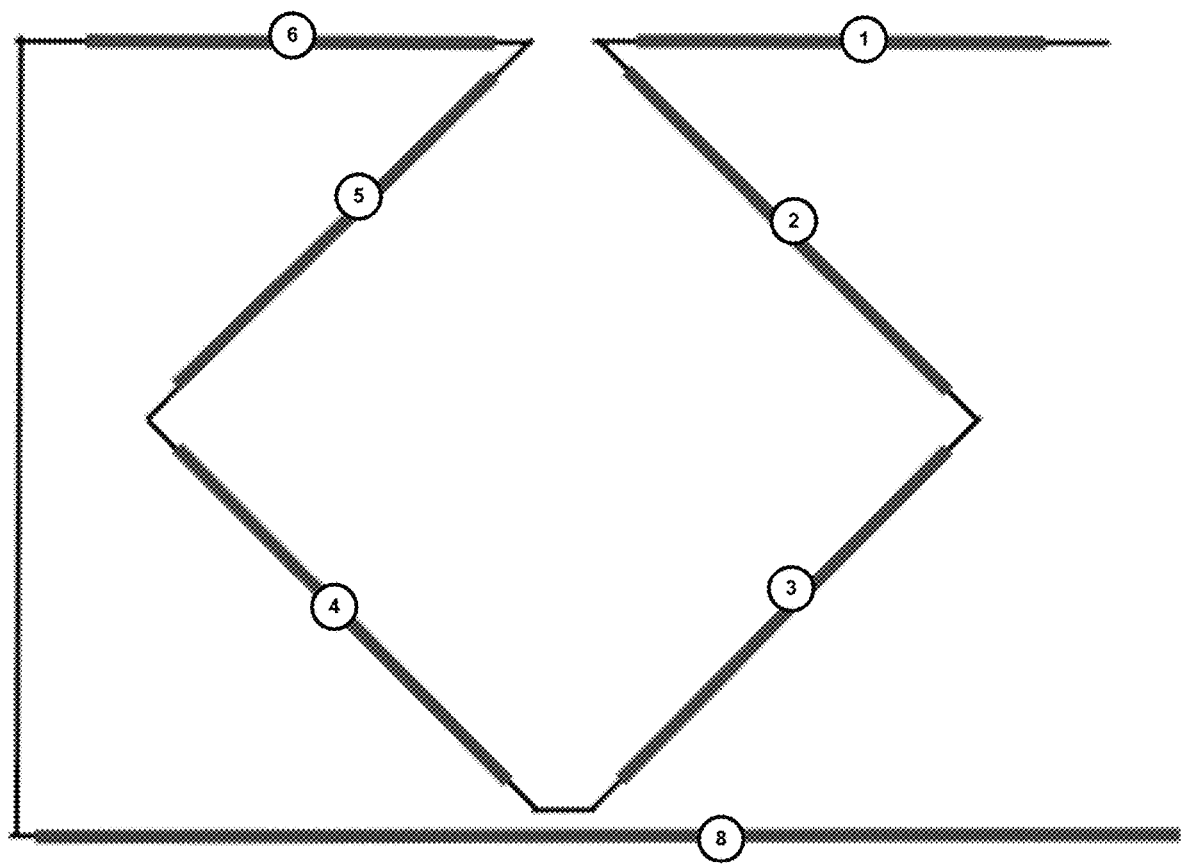
FIG. 6 is a schematic block diagram of an illustrative layout of optical fiber illustrating certain critical sensing parts/segments of the layout according to aspects of the present disclosure.

FIG. 6 is a schematic block diagram of an illustrative layout of optical fiber illustrating certain critical sensing parts/segments of the layout according to aspects of the present disclosure. As shown in the figure, segments 1-6 and 8 are particularly critical to our inventive sensing layout as noted previously.

Figure 7:
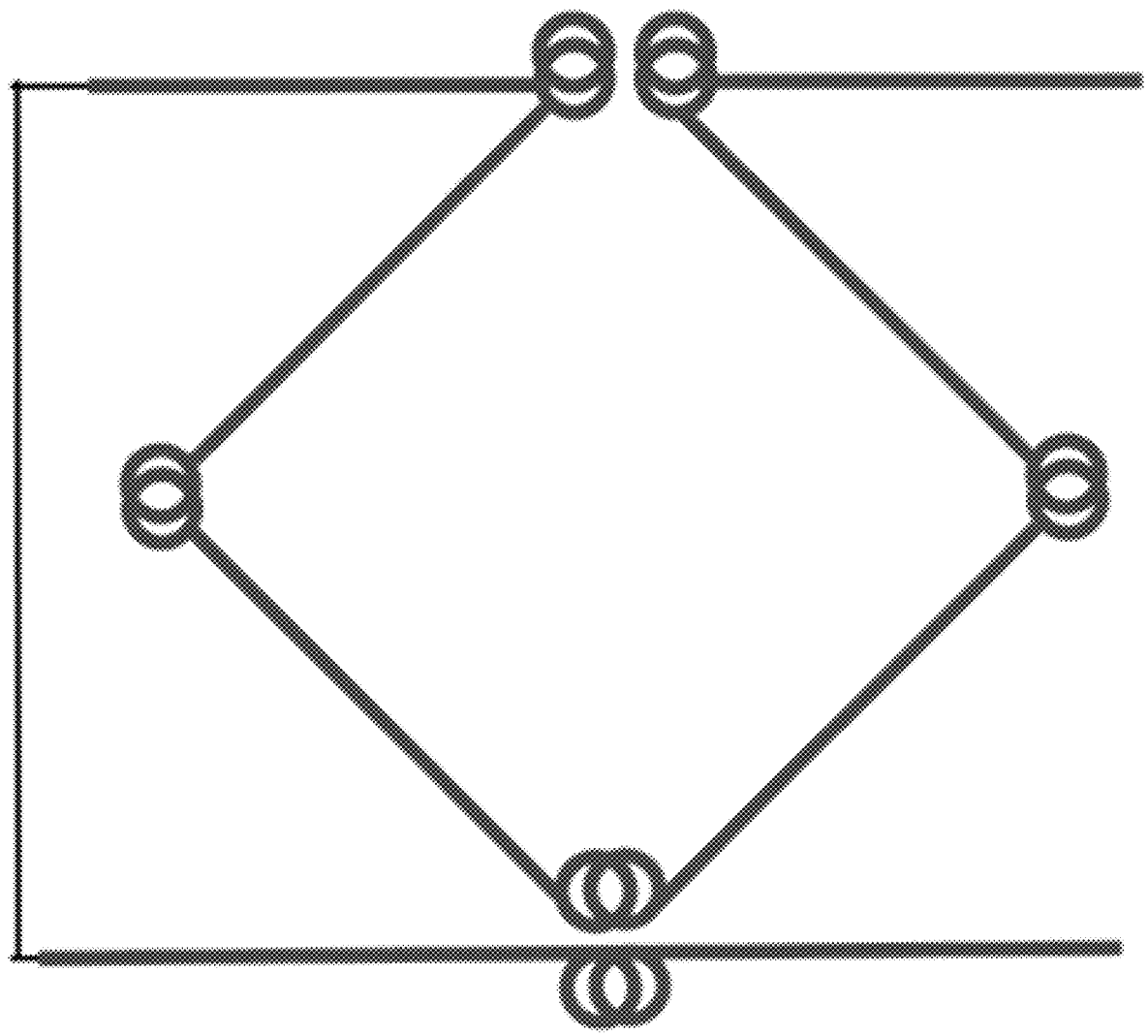
FIG. 7 is a schematic block diagram of an illustrative modified layout of optical fiber adapted for longer pulse DAS system according to aspects of the present disclosure.

FIG. 7 is a schematic block diagram of an illustrative modified layout of optical fiber adapted for longer pulse DAS system according to aspects of the present disclosure. As shown in this figure, at several transition/extension points from one of the sections identified previously to a next section, the fiber is arranged in one or more loops of fiber. As such, the loops will overlie a portion of the fiber itself.

Figure 8:
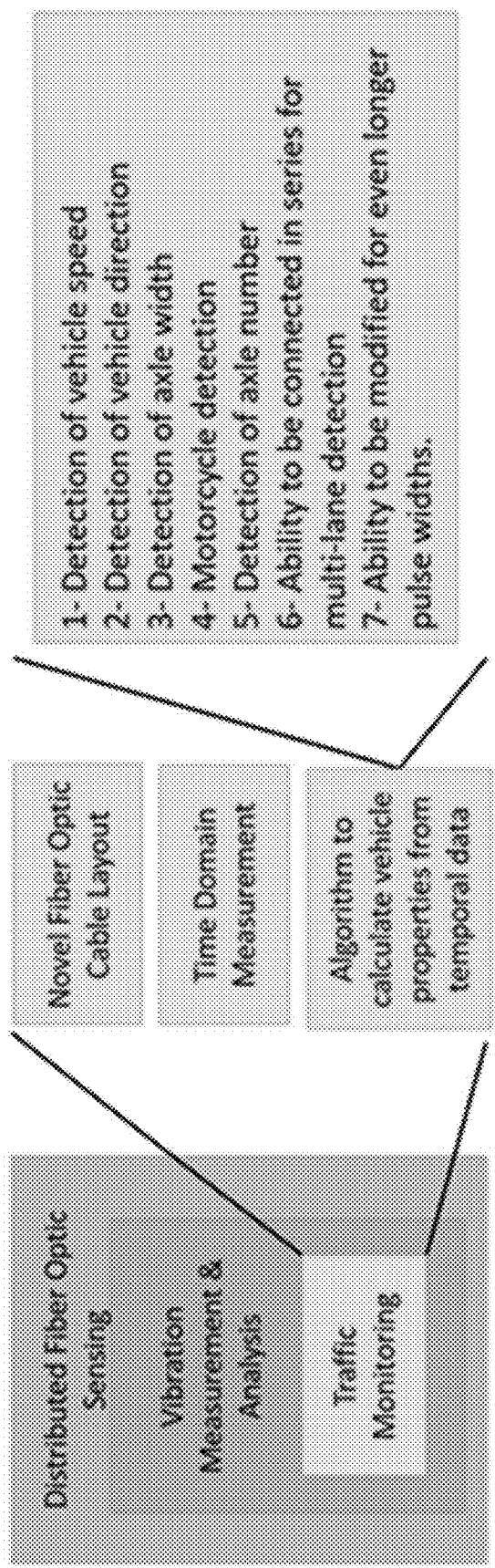
FIG. 8 is a block diagram of illustrative features provided by systems, methods, and structures according to aspects of the present disclosure.

FIG. 8 is a block diagram of illustrative features provided by systems, methods, and structures according to aspects of the present disclosure. As may be observed from this figure, our inventive systems, methods, and structures according to aspects of the present disclosure provide for sophisticated traffic measurement and monitoring by DFOS using our optical fiber layout(s) described. Our illustrative disclosure provides for the time domain measurement and further determination vehicle type(s) and properties from temporal data. Accordingly, systems, methods, and structures according to aspects of the present disclosure advantageously permit: detection/determination of vehicle speed, detection/determination of vehicle direction, detection/determination of axle width, detection/determination of motorcycles, detection/determination of a number of axles on a given vehicle, detection/determination of these in a multi-lane highway, and an ability to modify the fiber layout for enhanced/longer pulse widths.

At this point, while we have presented this disclosure using some specific examples, those skilled in the art will recognize that our teachings are not so limited. Accordingly, this disclosure should only be limited by the scope of the claims attached hereto.

The invention claimed is:

1. A method of measuring vehicles traveling along a roadway using temporal distributed fiber optic sensing (DFOS), the method comprising:
   providing a length of optical fiber; and
   providing a distributed optical fiber sensing interrogator in optical communication with the length of optical fiber, wherein the at least a portion of the length of optical fiber is located under the roadway, and arranged in a non-overlapping, polygon shape;
   operating the distributed optical fiber sensing interrogator to determine vibration sources at one or more points along the length of the optical fiber located underneath the roadway; and
   determining, from the vibration sources, for a vehicle operating on the roadway, the vehicle direction, the vehicle axle width, the vehicle direction of travel, a number of axles for the vehicle, and whether or not the vehicle is a motorcycle.

2. A distributed optical fiber sensing (DOFS) system for vehicle measurement, said system comprising:
   a length of optical fiber positioned underneath a roadway surface; and
   a distributed optical fiber sensing interrogator in optical communication with the length of optical fiber;
   wherein the length of optical fiber is configured in a non-overlapping polygon shape.

3. The system of claim 2 wherein the length of optical fiber is configured substantially in a 4-sided polygon shape.

4. The system of claim 2 wherein the length of optical fiber is configured such that a diagonal of the polygon is aligned substantially parallel to a length of the roadway and a primary direction of traffic operating on the roadway.

5. The system of claim 2 wherein the length of optical fiber is non-overlapped and includes at least 4 sections, a first section of optical fiber, a second section of optical fiber having at least a portion that is perpendicular to the first section of optical fiber, a third section of optical fiber having at least a portion that is perpendicular to the second section and parallel to the first section, and a fourth section having at least a portion that is perpendicular to the third section and parallel to the second section.

6. The system of claim 4 wherein the roadway is a multi-lane roadway and the optical fiber is positioned underneath a plurality of the lanes, each of the lanes having disposed underneath a length of the optical fiber having a polygonal shape exhibiting the four sections, each of the length having a polygonal shape optically connected to adjacent one(s) in series arrangement.

7. The system of claim 2 wherein the polygon shape is a quadrilateral, having four straight sides.

8. The system of claim 2 wherein the polygon shape is a rhombus, with four equal length sides with equal opposite angles.

9. The system of claim 2 wherein the polygon shape is a parallelogram.

10. The system of claim 2 wherein the polygon shape is a quadrilateral, and the optical fiber is looped at each corner of the quadrilateral.

* * * * *